US007677448B2

(12) United States Patent
Guan et al.

(10) Patent No.: US 7,677,448 B2
(45) Date of Patent: Mar. 16, 2010

(54) METHOD TO PREVENT METERED TONER GRAY MARKET LEAKAGE

(75) Inventors: Leonard Guan, Wilsonville, OR (US); Robin Y. Wessel, Wilsonville, OR (US)

(73) Assignee: Xerox Corporation, Rochester, NY (US)

( * ) Notice: Subject to any disclaimer, the term of this patent is extended or adjusted under 35 U.S.C. 154(b) by 952 days.

(21) Appl. No.: 11/149,908

(22) Filed: Jun. 10, 2005

(65) Prior Publication Data

US 2006/0278699 A1 Dec. 14, 2006

(51) Int. Cl.
*G06K 5/00* (2006.01)

(52) U.S. Cl. .......................... 235/382; 358/1.14; 347/5; 347/19; 347/86; 399/8; 399/12

(58) Field of Classification Search .................. 235/382
See application file for complete search history.

(56) References Cited

U.S. PATENT DOCUMENTS 5,016,171 A 5/1991 Connolly et al.
5,283,613 A 2/1994 Midgley, Sr.
5,444,764 A * 8/1995 Galecki ...................... 455/411
5,636,032 A 6/1997 Springett
5,809,375 A 9/1998 Owens, Jr. et al.
5,987,325 A * 11/1999 Tayloe ..................... 455/435.2
6,016,409 A 1/2000 Beard et al.
6,550,010 B1 * 4/2003 Link et al. .................. 713/168
2003/0013434 A1 * 1/2003 Rosenberg et al. .......... 455/414
2003/0059050 A1 * 3/2003 Hohberger et al. .......... 380/270

OTHER PUBLICATIONS

Tam, "Cartridges For A Cause," *Wall Street Journal*, May 16, 2005.

* cited by examiner

*Primary Examiner*—Daniel Walsh
*Assistant Examiner*—Tae Kim
(74) *Attorney, Agent, or Firm*—Marger, Johnson & McCollom PC

(57) ABSTRACT

A device, such as a printer or copier, identifies the type of module being used. If the type of module requires the device to receive an unlock code, the device prompts for the unlock code (which can be a hash of the serial number of the device). Once the unlock code is received, the device can be used with modules of that type. If the unlock code is not received, the device does not operate with modules of that type.

12 Claims, 6 Drawing Sheets

METHOD TO PREVENT METERED TONER GRAY MARKET LEAKAGE

BACKGROUND

This invention pertains to preventing writing materials from being used in devices for which they are not authorized.

Devices that use printing or copying technologies, such as printers and copiers, are commonly sold in one of two different formats. In one format, the devices are intended to be used with metered cartridges. Using metered cartridges, the customer does not purchase the cartridge itself (or pays a nominal amount), but rather pays a certain charge per sheet printed or copied. In the other format, the devices are intended to be used with unmetered cartridges. The customer purchases the unmetered cartridge, but does not pay anything per individual sheet printed or copied.

Because any given device can be used with either metered or unmetered cartridges, there are usually no physical differences between metered and unmetered cartridges. For devices using metered toner cartridges, the device itself tracks the number of sheets printed or copied, so that the appropriate charges can be computed. The expectation is that customers will use the appropriate type of cartridge based on their contract.

Unfortunately, whether by design or by accident, sometimes metered cartridges are used with devices that are not expecting metered cartridges. Because the device is not expecting a metered cartridge, the device does not count the number of sheets printed or copied. And because the cost of the metered cartridge is generally less than the cost of an unmetered cartridge (the assumption being that the difference in cost will be made up in the per-sheet charges), the customer ends up paying less for the consumables than expected by the seller. Such misuse of metered cartridges in unmetered devices is termed "leakage".

Leakage can occur in a number of different ways. A customer with both metered and unmetered devices can order metered cartridges as needed for all of the customer's devices, and use them even in unmetered devices. Or, a vendor (a middleman between the customer and the manufacturer) can order metered cartridges on behalf of a customer that uses both metered and unmetered devices, then sell the metered cartridges to the customer as unmetered cartridges, making a profit on the transaction (as the unmetered cartridges would be sold for a higher price than metered cartridges). Or, the vendor can take advantage of the fact that one customer uses a metered device to order cartridges to order metered cartridges for multiple customers, selling the excess cartridges to other customers.

The invention addresses these problems and others in the art.

SUMMARY

A cartridge designed to prevent leakage includes a chamber to store writing material. The cartridge also includes a key. The key identifies whether the device is a metered or unmetered cartridge. A device can use the key to identify the cartridge. If the cartridge in a metered cartridge, the device can prevent use of the device with the cartridge unless an unlock code is provided. The unlock code can be provided to the customer at the time the device is ordered, if the device is intended to be used with metered cartridges.

DETAILED DESCRIPTION

U.S. Pat. No. 6,016,409, titled "SYSTEM FOR MANAGING FUSER MODULES IN A DIGITAL PRINTING APPARATUS", issued Jan. 18, 2000, assigned to the assignee of this patent application and incorporated hereby reference, describes a system for managing modules in a digital printing apparatus. Part of the disclosure of the '409 patent describes Customer Replacement Unit Monitors, or CRUMs. In short, a CRUM is a module that a customer can replace for use with the device. An example of a CRUM is toner cartridge 105, such as that shown in connection with printer 110 in FIG. 1. But a person skilled in the art will recognize that any device that uses any variety of module can substitute for printer 110 and cartridge 105. For example, device 110 could be an inkjet printer, a thermal dye printer, or any variety of copier, among other possibilities. Similarly, module 105 could be an inkjet cartridge, a solid ink cartridge, or any other variety of module (and not limited to modules that manage toner, ink, or wax for printing). The '409 patent describes other varieties of modules with which an embodiment can be used. Module 105 can be either a metered module (where the actual use of the module is used in determining cost to the customer) or an unmetered cartridge (where the cost of the module is determined independently from the actual use of the module). More information about CRUMs can be found in U.S. Pat. No. 5,809,375, titled "MODULAR XEROGRAPHIC CUSTOMER REPLACEABLE UNIT (CRU)", issued Sep. 15, 1998, also assigned to the assignee of this patent application and hereby incorporated by reference. For the remainder of this patent application, module 105 is referred to as a cartridge, even though embodiments are applicable to other varieties of modules.

Figure 2:
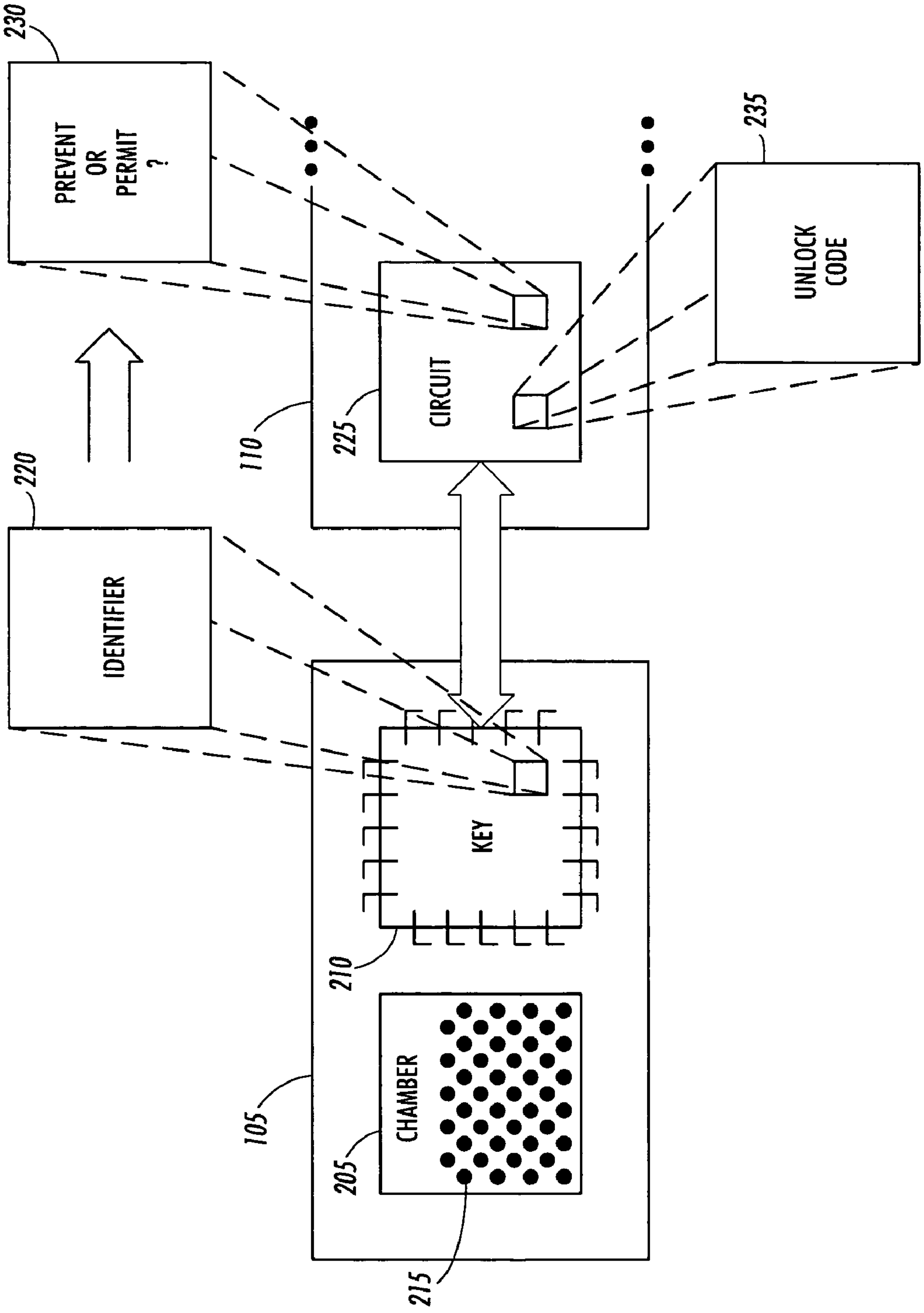
FIG. 2 shows details of the device and cartridge of FIG. 1.

To prevent leakage, if cartridge 105 is a metered cartridge, cartridge 105 needs to identify itself as such to device 110. FIG. 2 shows how this can be accomplished. In FIG. 2, portions of device 110 and cartridge 105 are shown, without necessarily being complete.

Cartridge 105 is shown as including two primary elements: chamber 205 and key 210. Chamber 205 stores the writing material for use with the device. For example, as cartridge 105 is shown as a toner cartridge, chamber 205 stores toner, represented as toner particles like particle 215. If cartridge 105 is an inkjet cartridge, then chamber 205 can store the liquid ink. With solid ink technology, chamber 205 is more an abstract concept than a physical container, because the solid ink might not be enclosed, but the principal is consistent. And with thermal dye technology, the film carrying the thermal ink can be thought of as chamber 205. In short, chamber 205 is the means by which the writing material (be it toner, ink, wax, or any other substance) is stored until it is used by the device.

Key 210 can be part of a CRUM technology of Xerox Corporation. Key 210 can be an electronic key or a physical key. If key 210 is an electronic key, then key 210 is designed to interact with a circuit of some sort on the device. If key 210 is a physical key, then key 210 is designed to mate with a matching physical element within device 110. Either way, device 110 includes a connection point designed to establish a connection with module 105, so that device 110 can access information from module 105.

The information device 110 can access can include identifier 220, which identifies whether or not cartridge 105 is a metered cartridge. If key 210 is an electronic key, then identifier 220 can be stored in any desired electronic manner: e.g., in non-volatile memory, in firmware, or in the hardware of key 210, among other possibilities. If key 210 is a physical key, then the shape of key 210 can be used to "store" identifier 220. (Even if key 210 is an electronic key, identifier 220 can be determined by the shape of a physical element of key 210.) Circuit 225 interfaces with key 210 to access identifier 220 and determine whether or not cartridge 105 is a metered cartridge. (If key 210 is a physical key, then at least part of circuit 225 is the physical mate to key 210, which enables device 110 to determine whether or not cartridge 115 is a metered cartridge.)

Circuit 225 includes tester 230, which determines whether to permit device 110 to use cartridge 105 or to prevent device 110 from using cartridge 105. Thus, if cartridge 165 is a metered cartridge, then tester 230 can be used to determine whether or not device 110 is expected to use metered cartridges: if not, then tester 230 can prevent device 110 from using cartridge 105.

If tester 230 determines that device 110 should be prevented from using cartridge 105, then device 110 can either completely block cartridge 105 from being used, or device 105 can determine whether the cartridge should be accepted. Specifically, device 110 can prompt for unlock code 235. This prompt can be presented on a display built in to device 110 (if device 110 includes a display), or can be presented to the customer in other ways. For example, if device 110 is connected to a computer, device 110 can instruct the computer to display a dialog box, prompting the customer for the unlock code.

Unlock code 235 can be any unlock code that is recognized by device 110 and provided to the user of device 110. Unlock code 235 can be generated as a hash of the serial number of device 110. Preferably, the hash algorithm is not easily determined, so as to prevent an unscrupulous vendor from figuring out the hash algorithm and being able to provide unlock codes to other clients without the manufacturer generating the unlock codes. In this embodiment, device 110 is programmed with the hash algorithm, and can determine unlock code 235 by hashing the serial number. Alternatively, unlock code 235 can be generated by the manufacturer using any desired technique (which might include randomly or pseudo-randomly generating the unlock code or using an algorithm that relies on information about the order, either with or without the serial number of device 110). In this embodiment, unlock code 235 is stored in circuit 225 (e.g., in non-volatile memory, or within firmware or hardware of circuit 225).

Once device 110 has prompted for unlock code 235, device 110 determines whether the correct unlock code has been provided. If the correct unlock code has been provided (that is, the provided unlock code matches unlock code 235 stored in circuit 225), then device 110 can use cartridge 105. If an incorrect unlock code was provided, then device 110 can prevent use of cartridge 105. The device can inform the customer that an incorrect unlock code was provided. This notification can be accomplished in many different ways. For example, if device 110 includes a display, device 110 can display an error message to the user. Or, if device 110 is connected to another device (such as a computer), device 110 can relay the error message to the user via the other device (e.g., displaying an error message on the computer). A person skilled in the art will recognize other ways in which the customer can be informed that an incorrect unlock code was provided.

In one embodiment, device 110 prompts for unlock code 235 only when a metered cartridge is first used with device 110. In this embodiment, device 110 can be used with unmetered cartridges, even if device 110 was sold under a metered cartridge contract. A person skilled in the art will recognize how this can be generalized, so that one type of module can be used with the device without the unlock code, but another type of module cannot be used without the unlock code. In another embodiment, device 110 prompts for unlock code 235 as part of starting up, so that device 110 does not operate at all (regardless of cartridge type) until the correct unlock code is provided.

Assuming that the correct unlock code is provided, circuit 225 can also include a location to store the fact that the unlock code was successfully provided. By storing a notation that the unlock code has been successfully provided, device 110 avoids the need for prompting for the unlock code each time a new metered cartridge is inserted into device 110. This storage can be in any desired manner: for example, a location in non-volatile memory.

Figure 3:
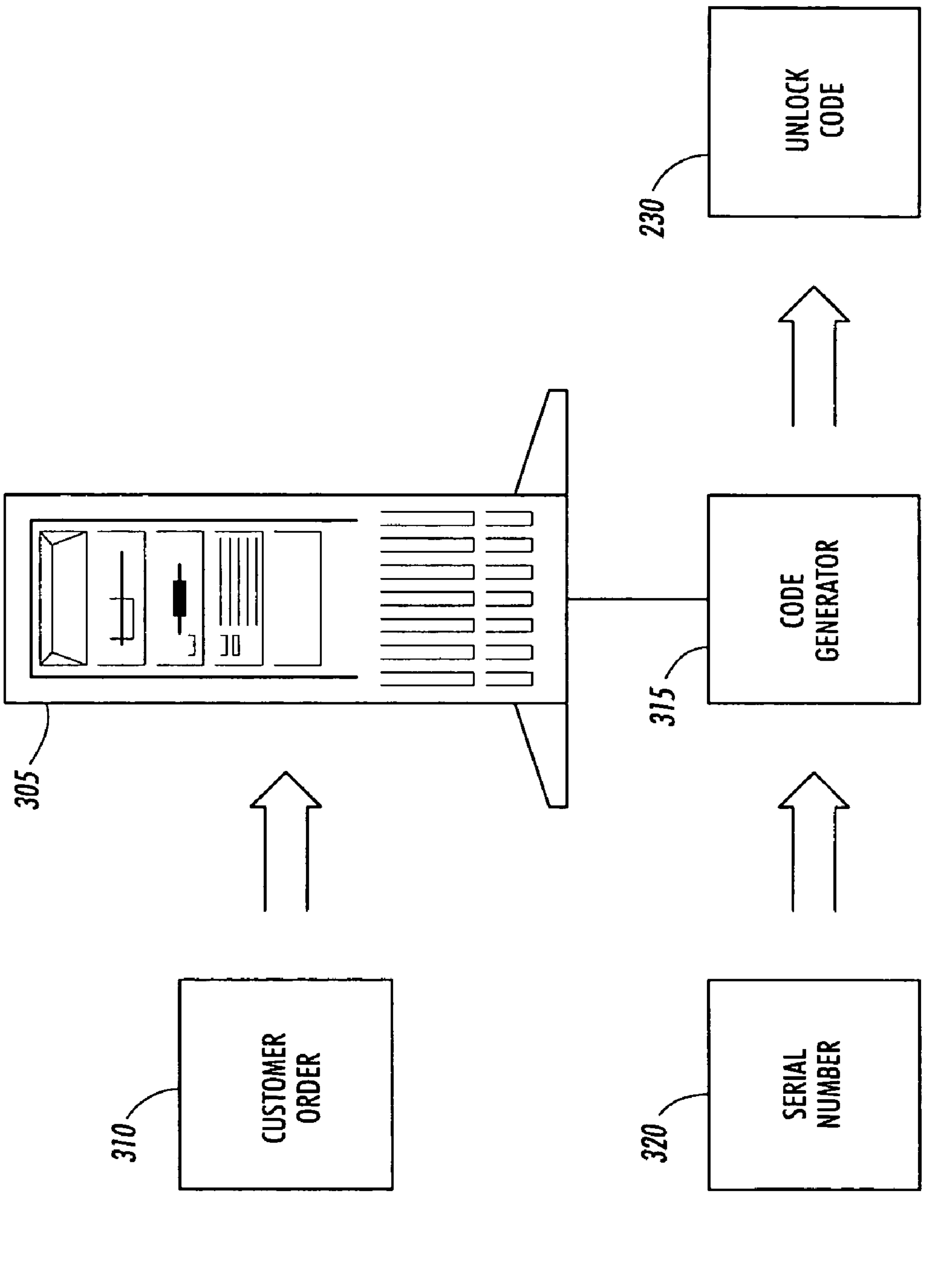
FIG. 3 shows a system for ordering the device of FIG. 1 designed to be used with metered cartridges.

As can be seen from the above description, to prevent leakage, the unlock code for the device needs to be controlled. In one embodiment, the unlock codes are controlled by having the manufacturer provide (either directly or indirectly) the unlock code to the customer. FIG. 3 shows a system for ordering the device of FIG. 1 designed to be used with metered cartridges. In FIG. 3, order receiver 305 is shown as capable of receiving an order, such as order 310, from a customer. (Order 310 can be received directly from the customer, or can be received from a vendor on behalf of the customer.) Order receiver 305 is a system that includes code generator 315. Code generator 315 receives the serial number of the device to be delivered to the customer (shown in FIG. 3 as serial number 320) and generates unlock code 235. As described above with reference to FIG. 2, in one embodiment unlock 235 is a hash of just serial number 320; in another embodiment, unlock code 235 is a hash that includes other factors, either including or excluding serial number 320; and in yet another embodiment, unlock code 235 is a random number. If unlock code 235 is a hash of just serial number 320, then, assuming that the device includes an implementation of the hash algorithm, the device can verify the unlock code simply by determining the serial number of the device; otherwise, the device should include unlock code 235 somewhere (as described above with reference to FIG. 2).

Once the unlock code has been generated by code generator 315, the system can then deliver the device and unlock code 235 to the customer. This delivery can be either directly to the customer or indirectly (e.g., via a vendor). The unlock code can be directly delivered in a number of ways: e.g., by mail, by e-mail, by facsimile, by telephone, and can be delivered indirectly using any of these means as well.

The above discussion assumes that the customer or vendor knows serial number 320 of the device the customer desires. Often a customer is interested in a particular model of device, but not concerned about the specific device they receive. In that case, the system can receive information about the model the customer desires, and can select serial number 320 from the serial numbers of devices available for delivery to the customer.

Figure 1:
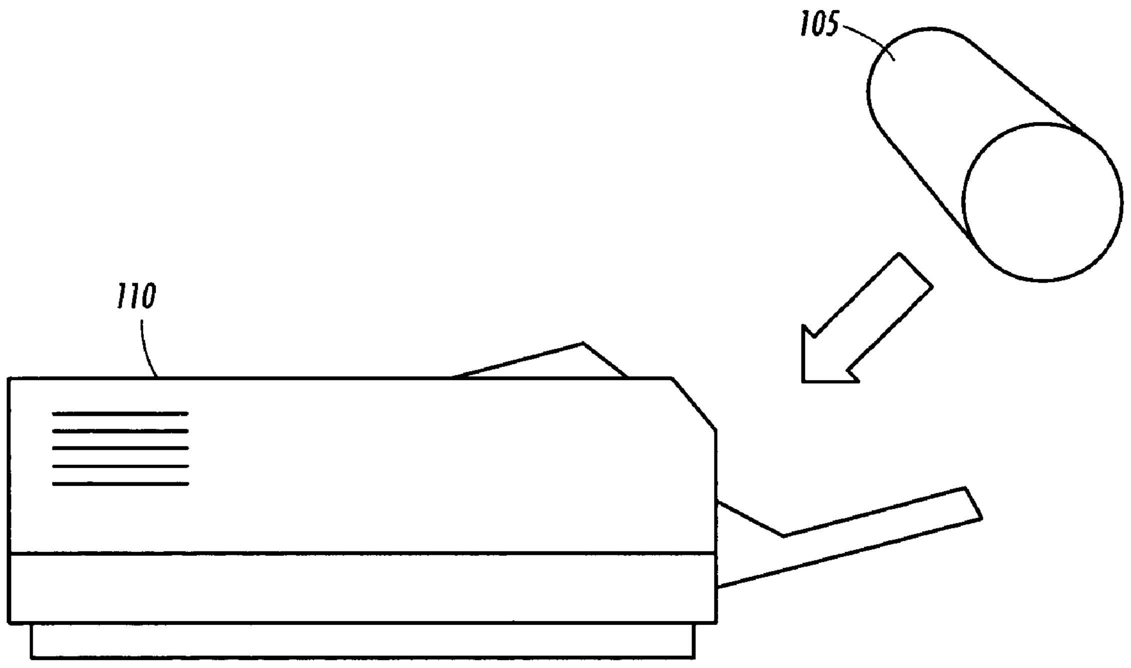
FIG. 1 shows a device and a cartridge designed to prevent leakage, according to an embodiment.
Figure 4:
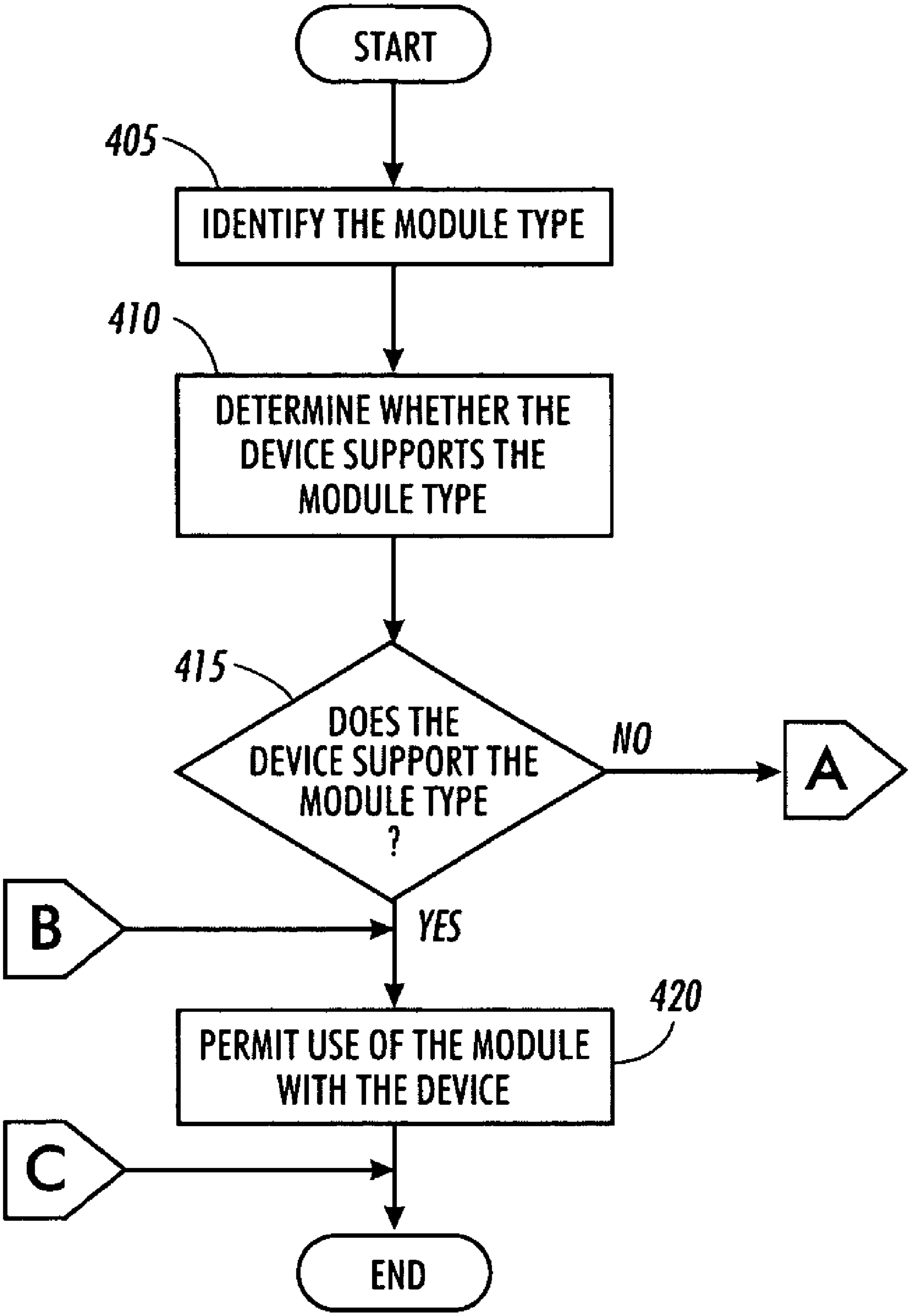
FIGS. 4-5 show a flowchart of the procedure for the device of FIG. 1 to determine whether the cartridge is a metered cartridge and whether to permit the cartridge's use.
Figure 5:
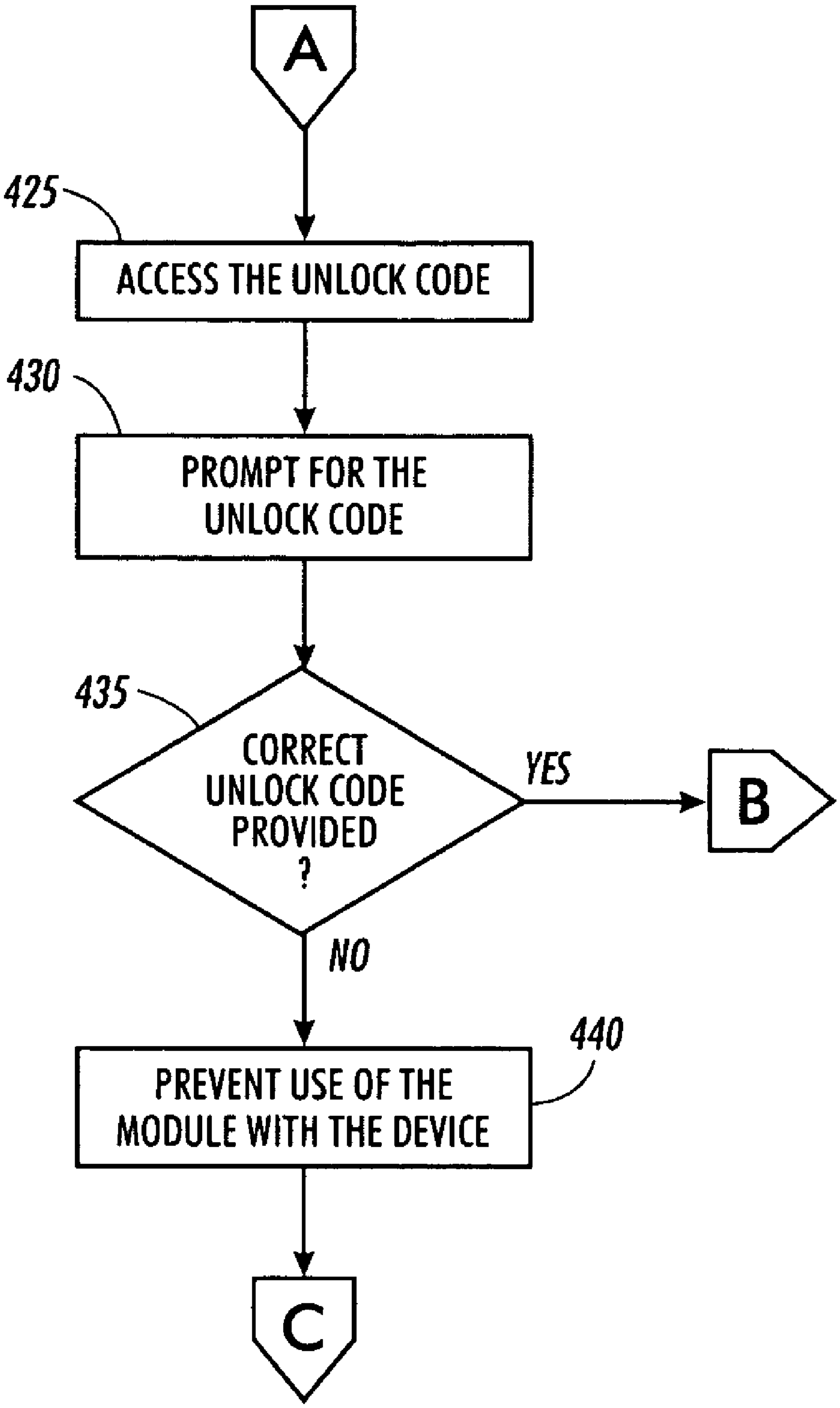

FIGS. 4-5 show a flowchart of the procedure for the device of FIG. 1 to determine whether the cartridge is a metered cartridge and whether to permit the cartridge's use. In FIG. 4, at step 405, the device identifies the module type (e.g., metered or unmetered). At step 410, the device determines whether it supports the module type. For example, most device can be configured to support unmetered cartridges (as they do not require a per-sheet charge for printing or copying), but only devices operated under a metered contract should support a metered cartridge. At step 415, the device determines whether it supports the module type. If the device supports the type of module, then at step 420 the device permits use of the module. Otherwise, at step 425 (in FIG. 5) the device accesses the unlock code (which can be determined, for example, by hashing the serial number of the device. At step 430 the device prompts for an unlock code. At step 435, the device checks to see if the correct unlock code was provided. If the correct unlock code was provided, the processing continues at step 420 (FIG. 4), where the device permits use of the module. Otherwise, at step 440 (FIG. 5) the device prevents use of the module.

As discussed above with reference to FIG. 2, typically the device will prompt for the unlock code only once. Thus, if the unlock code has been previously provided, then step 415 will indicate that the device supports the module type: that is, after the unlock code is provided, that module type is considered supported. This avoids the device prompting for the unlock code each time a metered cartridge is inserted into the device.

In addition, as discussed above with reference to FIG. 2, the device can be configured to prompt for the unlock code before any use of the device is permitted. Thus, for example, even if an unmetered cartridge is inserted into the device, the test at step 415 can return a negative result. Then, once the unlock code is provided, the device is unlocked for all appropriate module types, including both metered and unmetered cartridges.

At least in the context of cartridges used for printing and/or copying, there are currently only two types of cartridges with which devices such as printers and copiers work: metered and unmetered. This makes preventing leakage easy: if the device is intended for use with only unmetered cartridges, the manufacturer does not provide the customer with the unlock code, and the customer will not be able to unlock the device to use metered cartridges. If, in the future, other types of cartridges are designed, different unlock codes can be used to unlock different cartridge types. Thus, the hash algorithm used to generate the unlock code can use the cartridge type identifier as part of the hash algorithm, or different unlock codes can be stored in the device to support the different cartridge types. Additional storage (e.g., in non-volatile memory) can be provided in the device to indicate which unlock codes have been provided and which have not. Alternatively, a single unlock code can be used to unlock all features of a device, even types of modules that have not yet been used with the device.

Figure 6:
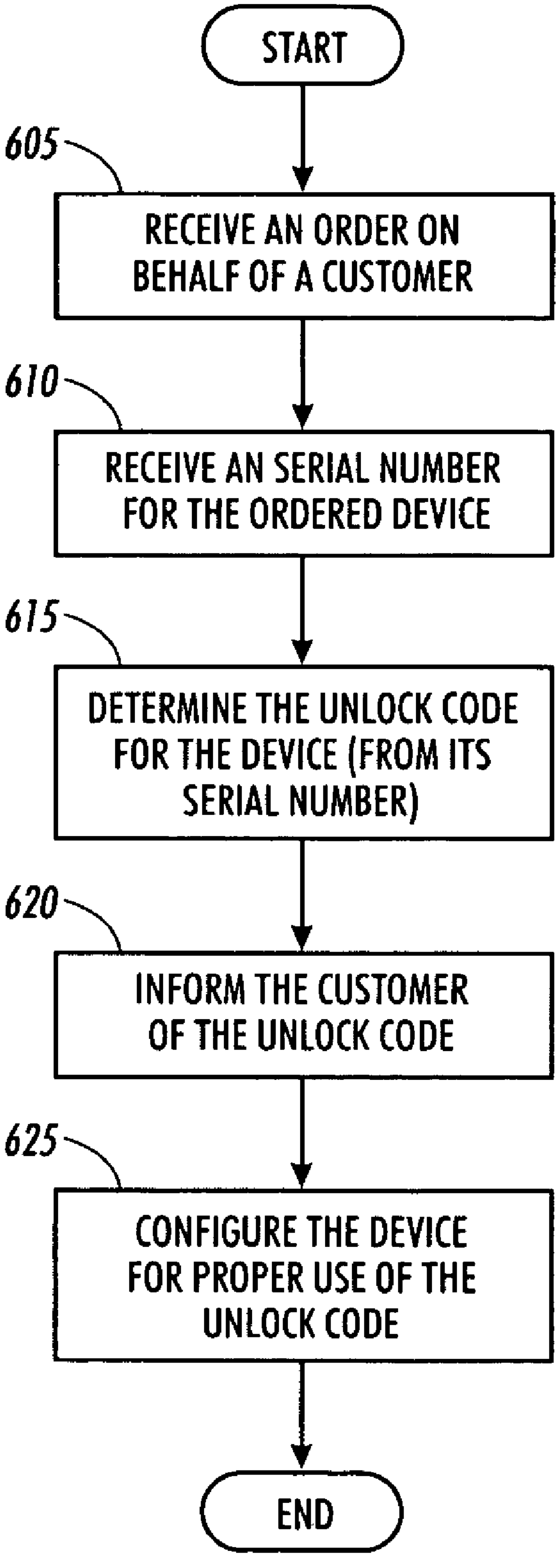
FIG. 6 shows a flowchart of the procedure for managing an order of a device to use metered cartridges.

FIG. 6 shows a flowchart of the procedure for managing an order of a device to use metered cartridges. At step 605, the system receives an order on behalf of a customer. As described above with reference to FIG. 3, the order can be received directly from the customer, or can be received indirectly (e.g., via a vendor). At step 610, the system receives the serial number of a desired device. Again, as described above with reference to FIG. 3, the system can simply receive a desired model and select the serial number of an available device. At step 615, the system determines the appropriate unlock code. If the unlock code is a hash of the serial number, then the system already has all the information needed to generate the unlock code. But if the unlock code is generated using other information, then the system might need to prompt for the needed additional information. At step 620, the system informs the customer (either directly or indirectly) of the unlock code. Finally, at step 625, the system configures the device for proper use of the unlock code. If the unlock code is just a hash of the serial number of the device, then no special configuration is necessary. But if the unlock code depends on data other than just the serial number of the device, then the device is to be configured with the unlock code. After the device is properly configured, the device can be delivered to the customer.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A system for preventing gray market leakage, comprising:

an order receiver to receive an order pertaining to the use of a module in a device for a customer, wherein said device is drawn from a set consisting of a printer and a copier;

a code generator to generate an unlock code for said device to operate with said module; and a transmitter to transmit said unlock code to said customer, wherein said device is configured to prompt for said unlock code before said device can be used with said module, without an expiration for said unlock code, said module being of a first type, but said device is configured not to prompt for said unlock code before said device can be used with a second module of a second type, wherein the module of the first type can be used with a second device without requiring the unlock code to be input to the second device.

2. A system according to claim 1, wherein the code generator is designed to generate said unlock code using information relating to said order.

3. A system according to claim 2, wherein:

said device includes a serial number; and the code generator is designed to generate said unlock code for said device based on said serial number.

4. A system according to claim 1, wherein the code generator is designed to generate said unlock lock as a random number.

5. A system according to claim 1, wherein:

the order receiver is designed to receive an order for said device from a vendor on behalf of said customer; and the transmitter is designed to transmit the unlock code to said customer via said vendor.

6. A system according to claim 1, wherein the transmitter includes a mailer to mail the unlock code to the customer.

7. A system according to claim 1, wherein the transmitter includes an e-mailer to e-mail the unlock code to the customer.

8. A method for selling a device, comprising:

receiving an order for the device on behalf of a customer, wherein the device is drawn from a set consisting of a printer and a copier;

configuring the device to recognize an unlock code before the device can use a module;

configuring the device to prevent operation with the module of a first type until the unlock code is input to the device, without an expiration for said unlock code, but to permit use of a second module of a second type before the unlock code is input to the device, wherein the module of the first type can be used with a second device without requiring the unlock code to be input to the second device; and informing the customer of the unlock code.

9. A method according to claim 8, wherein configuring the device to recognize an unlock code includes generating the unlock code using information relating to the order.

10. A method according to claim 9, wherein:

receiving an order for the device includes identifying a serial number for the device; and generating the unlock code includes generating the unlock code based on the serial number.

11. A method according to claim 8, wherein configuring the device to recognize an unlock code includes generating a random number as the unlock code.

12. A computer-readable medium containing instructions that, when executed by a machine, result in implementing the method of claim 8.

* * * * *